United States Patent
Hong et al.

(10) Patent No.: US 11,688,285 B2
(45) Date of Patent: Jun. 27, 2023

(54) DYNAMIC COLLISION AVOIDANCE METHOD FOR UNMANNED SURFACE VESSEL BASED ON ROUTE REPLANNING

(71) Applicant: SOUTH CHINA UNIVERSITY OF TECHNOLOGY, Guangzhou (CN)

(72) Inventors: Xiaobin Hong, Guangzhou (CN); Kuncai Zhu, Guangzhou (CN); Xinyong Wei, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/620,755

(22) PCT Filed: Oct. 31, 2019

(86) PCT No.: PCT/CN2019/114906
§ 371 (c)(1),
(2) Date: Dec. 20, 2021

(87) PCT Pub. No.: WO2020/253028
PCT Pub. Date: Dec. 24, 2020

(65) Prior Publication Data
US 2022/0415183 A1    Dec. 29, 2022

(30) Foreign Application Priority Data

Jun. 18, 2019 (CN) .......................... 201910528122.0

(51) Int. Cl.
*G01S 5/02* (2010.01)
*G08G 3/02* (2006.01)
(Continued)

(52) U.S. Cl.
CPC .............. *G08G 3/02* (2013.01); *B63B 79/10* (2020.01); *G01C 21/005* (2013.01); *G01C 21/16* (2013.01);
(Continued)

(58) Field of Classification Search
CPC ... G01S 5/02; G01S 19/42; G05D 2201/0207; G05D 1/02; G05D 1/0206; G01C 21/203; G01C 21/16; B63B 79/10; G08G 3/02
(Continued)

(56) References Cited

U.S. PATENT DOCUMENTS

| 7,602,311 B2 * | 10/2009 | Price | B60W 30/16 |
| | | | 340/436 |
| 8,676,487 B2 * | 3/2014 | Sakai | B60W 40/02 |
| | | | 701/300 |

(Continued)

FOREIGN PATENT DOCUMENTS

| CN | 105717923 | 6/2016 |
| CN | 107748561 | 3/2018 |

(Continued)

OTHER PUBLICATIONS

M. S. Wiig, K. Y. Pettersen and T. R. Krogstad, "Collision Avoidance for Underactuated Marine Vehicles Using the Constant Avoidance Angle Algorithm," in IEEE Transactions on Control Systems Technology, vol. 28, No. 3, pp. 951-966, May 2020, doi: 10.1109/TCST.2019.2903451.(Year: 2019).*

(Continued)

*Primary Examiner* — Cuong H Nguyen
(74) *Attorney, Agent, or Firm* — JCIPRNET (57) ABSTRACT

Disclosed is a dynamic collision avoidance method for an unmanned surface vessel based on route replanning. The method comprises the following steps: acquiring navigation information and pose information of a neighboring ship of an unmanned vessel itself via a vessel-borne sensor; constructing a collision cone between the unmanned vessel and the neighboring ship; introducing a degree of uncertainty with respect to observing movement information of the neighboring ship and applying a layer of soft constraint to the collision cone; applying a speed and a heading limit (Continued)

range of the unmanned vessel; acquiring an ultimate candidate speed set; introducing a cost function to select an optimum collision avoidance speed; and performing an internal recycle of navigation simulation with the optimum collision avoidance speed to obtain a route replanning point for dynamic collision avoidance of the unmanned vessel. According to the present invention, a dynamic collision avoidance strategy of the unmanned surface vessel is output in form of route replanning to meet constraints of international regulations for preventing collisions at sea, and it is well adapted to manipulate and control the unmanned vessel itself, so that a dynamic collision avoidance requirement of the unmanned vessel is met.

9 Claims, 3 Drawing Sheets (51) Int. Cl.
    *B63B 79/10*     (2020.01)
    *G01C 21/00*     (2006.01)
    *G01C 21/16*     (2006.01)
    *G01C 21/20*     (2006.01)
    *G01S 19/42*     (2010.01)
    *G05D 1/02*     (2020.01)

(52) U.S. Cl.
    CPC ............ *G01C 21/203* (2013.01); *G01S 19/42* (2013.01); *G01S 5/02* (2013.01); *G05D 1/0206* (2013.01); *G05D 2201/0207* (2013.01)

(58) Field of Classification Search
    USPC .......................................... 701/21, 301, 519
    See application file for complete search history.

(56) References Cited

U.S. PATENT DOCUMENTS

2011/0313664 A1* 12/2011 Sakai .................... B60W 40/02
                                                                  701/301

2012/0265380 A1* 10/2012 Kuwata ................ G05D 1/0206
                                                                  701/21

FOREIGN PATENT DOCUMENTS

| CN | 107748561 | A | * | 3/2018 | ........... G05D 1/0206 |
|---|---|---|---|---|---|
| CN | 108459602 | A | * | 8/2018 | ........... G01C 21/203 |
| CN | 109460045 | | | 3/2019 | |
| CN | 110362074 | | | 10/2019 | |
| CN | 110362074 | A | * | 10/2019 | ............. B63B 79/10 |
| CN | 110618685 | A | * | 12/2019 | ........... G05D 1/0206 |
| CN | 110222885 | B | * | 7/2020 | ............. G01S 19/42 |
| CN | 110362074 | B | * | 11/2021 | ............. B63B 79/10 |
| CN | 115167447 | A | * | 10/2022 | ............... G05D 1/02 |
| WO | WO-2020253028 | A1 | * | 12/2020 | ............. B63B 79/10 |

OTHER PUBLICATIONS

Y. Cho, J. Han and J. Kim, "Efficient COLREG-Compliant Collision Avoidance in Multi-Ship Encounter Situations," in IEEE Transactions on Intelligent Transportation Systems, vol. 23, No. 3, pp. 1899-1911, Mar. 2022, doi: 10.1109/TITS.2020.3029279 (Year:2022).*

Y. Cho, J. Kim and J. Kim, "Intent Inference-Based Ship Collision Avoidance in Encounters With Rule-Violating Vessels," in IEEE Robotics and Automation Letters, vol. 7, No. 1, pp. 518-525, Jan. 2022, doi: 10.1109/LRA.2021.3130386 (Year: 2022).*

L. Chen, Y. Fu, P. Chen and J. Mou, "Survey on Cooperative Collision Avoidance Research for Ships," in IEEE Transactions on Transportation Electrification, 2022, doi: 10.1109/TTE.2022.3221643 (Year: 2022).*

Yoshiaki Kuwata et al., "Safe Maritime Autonomous Navigation With COLREGS, Using Velocity Obstacles," in IEEE Journal of Oceanic Engineering, vol. 39, No. 1, Jan. 2014, pp. 110-119.

"International Search Report (Form PCT/ISA/210) of PCT/CN2019/114906," dated Mar. 19, 2020, with English translation thereof, pp. 1-6.

* cited by examiner

DYNAMIC COLLISION AVOIDANCE METHOD FOR UNMANNED SURFACE VESSEL BASED ON ROUTE REPLANNING

TECHNICAL FIELD

The present invention relates to the technical field of autonomous intelligent control of unmanned vessels, in particular to a dynamic collision avoidance method for the unmanned surface vessel based on route replanning.

BACKGROUND

Unmanned surface vessels used as a pioneer for future marine wars in military use are an important tool to safeguard maritime rights and interests and can replace crews to execute task in civil use, so that the work quantity of workers is reduced effectively and the operating risk is reduced effectively. The unmanned surface vessels have wide application requirements in the fields of military operations, sea patrols, supply for islands and reefs and the like. As a result of a complex marine environment, there is huge uncertainty, so that a highly intelligent collision avoidance level of the unmanned surface vessels is critical in safe navigation in a complex sea.

At present, although a certain achievement has been made on unmanned underwater vehicles in China, remarkable breakthroughs have not been made on an autonomous intelligent technology of the unmanned surface vessels, in particular, on a dynamic collision avoidance technology of the unmanned surface vessels. Therefore, research on a dynamic collision avoidance method for the unmanned surface vessel based on route replanning is of great significance in improving the autonomous intelligent level of the unmanned surface vessel and realizing popularization of the unmanned surface vessel in military and civil use.

SUMMARY

In order to overcome deficiencies and defects in the prior art, an objective of the present invention is to provide a dynamic collision avoidance method for the unmanned surface vessel based on route replanning. Aiming at a dynamic collision avoidance problem of the unmanned surface vessel, the present invention introduces description of a geometric model of a speed barrier region based on a direction bounding box and description of a moving model of the speed barrier region based on degree of uncertainty of speed to model the speed barrier region. A feasible speed set of the unmanned surface vessel is further constrained in combination with a dynamic characteristic of the unmanned surface vessel and international regulations for preventing collisions at sea, a cost function is introduced to calculate an optimum collision avoidance speed and route replanning is performed.

The objective of the present invention is at least realized by one of the technical schemes as follows.

The present invention provides a dynamic collision avoidance method for the unmanned surface vessel based on route replanning includes the following steps:

S1: collecting real-time data of a vessel-borne sensor, and acquiring geometric dimension information, movement information and pose information of an unmanned surface vessel body of a neighboring navigating ship;

S2: describing geometric information of the neighboring navigating ship and the unmanned surface vessel by using an oriented bounding box in combination with the geometric dimension information and movement information of the neighboring navigating ship and pose information of the unmanned surface vessel body, and establishing a speed set when the unmanned surface vessel collides with the neighboring navigating ship, i.e., constructing a collision cone between the unmanned surface vessel and the neighboring navigating ship;

S3: introducing the uncertainty of observing the velocity information of ships sailing in the neighborhood, translating the collision cone outwards at a quantity of an upper bound value of the degree of uncertainty, i.e., applying a layer of soft constraint to the collision cone, and taking the speed set out of constraint as a collision-free speed set;

S4: solving a speed and a heading limit range of the unmanned surface vessel in combination with a dynamic characteristic of the unmanned surface vessel itself, and performing an intersection operation with the collision-free speed set to obtain a feasible collision-free speed set of the unmanned surface vessel;

S5: dividing the feasible collision-free speed set according to different encountering situations in combination with the constraint of the international regulations for preventing collisions at sea to obtain an ultimate candidate speed set;

S6: performing discretization on the candidate speed set, introducing a cost function to evaluate each speed therein, and selecting the speed with the smallest cost as an optimum collision avoidance speed;

S7: performing an internal recycle of navigation simulation at the optimum collision avoidance speed to obtain a route replanning point for dynamic collision avoidance of the unmanned surface vessel.

Preferably, the step S1 specifically includes: acquiring the geometric dimension information and the movement information of the neighboring navigating ship by using the AIS system, acquiring longitude and latitude of the unmanned surface vessel by using GPS and acquiring a three-dimensional course angle of the unmanned surface vessel by using an electronic compass.

Preferably, the step S2 specifically includes: generating a smallest rectangular bonding frame along a main component direction of the unmanned surface vessel and the neighboring navigating ship to describe shapes of the unmanned surface vessel and the neighboring navigating ship uniformly and correspondingly; superposing the geometric dimension of the unmanned surface vessel itself to the neighboring navigating ship along a navigation direction, specifically, superposing the rectangular bounding frame of the unmanned surface vessel continuously by taking a point on a side line of the rectangular bonding frame of the neighboring navigating ship as a geometric center and regarding a most peripheral region after superposing as a barrier region so as to regard the unmanned surface vessel as a mass point; and started from the mass point, drawing two tangent lines of the barrier region, regarding a region surrounded by the two tangent lines as a speed barrier region, wherein the tangent line is a ray started from a geometric center $P_u$ of the unmanned surface vessel at a relative speed $v_r$:

$$\lambda(P_u, v_r) = \{P_u + v_r t | t \geq 0\} \quad (1),$$

wherein, in the formula (1), t represents a time, $v_r$ is a speed $v_r = v_u - v_o$ of the unmanned surface vessel relative to the neighboring navigating ship, $P_u$ and $v_u$ respectively represent a position vector and a speed vector of the unmanned surface vessel, and $v_o$ represents a speed vector of the neighboring navigating ship; when the ray $\lambda(P_u, v_r)$ is intersected with the speed barrier region, i.e., the ray falls between the two tangent lines of the speed barrier region, it can be thought that the unmanned surface vessel must collide with the neighboring navigating ship at a certain moment; defining a relative speed $v_r$ set when the unmanned surface vessel collides with the neighboring navigating ship as the collision cone $RCC_{UO}$ under the relative speed set; and defining an absolute speed $v_u$ set of all unmanned surface vessels when the unmanned surface vessel collides with the neighboring navigating ship as the collision cone $VO_{UO}$ under the absolute speed set:

$$VO_{UO}=RCC_{UO}\oplus v_o \quad (2),$$

wherein $\oplus$ in the formula (2) is Minkowski vector and operation with actual physical meaning of translating a relative collision region $RCC_{UO}$ at the speed $v_o$ of the neighboring navigating ship.

Preferably, the step S3 specifically includes: introducing a degree of uncertainty $\delta_O$ of the speed of the neighboring navigating ship after constructing the collision cone; categorizing all uncertain portions in a parameter of the speed of the neighboring navigating ship as a set $\{W_O|\delta_O\in W_O\}$, wherein the set $W_O$ is a bounded set and an upper bound thereof is a constant; and translating the collision cone outwards a quantity of an upper bound value of the degree of uncertainty, wherein a collision cone region $WVO_{UO}$ when the degree of uncertainty is the maximum (i.e., under the worst circumstance) can be constructed:

$$WVO_{UO}=VO_{UO}\oplus W_O \quad (3),$$

As the upper bound of the set of degree of uncertainty of speed of a dynamic barrier is a constant, it is enlarged by a circle based on the original collision cone, marked as $WVO_{UO}$, equivalent to provide a soft constraint with a safety buffering function for local obstacle avoidance of the unmanned surface vessel, and the speed set except $WVO_{UO}$ is marked as the collision-free speed set.

Preferably, the step S4 specifically comprises: introducing a concept of a dynamic window to further constrain a feasible speed space of the unmanned surface vessel in combination with the dynamic characteristic of the unmanned surface vessel itself; giving a time window $\Delta t$; and calculating a speed window $v_d$ and an angular speed window $\omega_d$ capable of being reached by the unmanned surface vessel within a time $\Delta t$, $$v_d = \left\{v \middle| v \in \left[v_c - \frac{g}{\dot{v}_b}\Delta t, v_c + \frac{g}{\dot{v}_a}\Delta t\right]\right\}, \quad (4)$$

$$\omega_d = \left\{\omega \middle| \omega \in \left[\omega_c - \frac{g}{\dot{\omega}_b}\Delta t, \omega_c + \frac{g}{\dot{\omega}_a}\Delta t\right]\right\}, \quad (5)$$

wherein, in the formulas (4) and (5), v and $\omega$ are respectively a speed and an angular speed of the unmanned surface vessel, $v_c$ and $\omega_c$ respectively represent the current speed and angular speed of the unmanned surface vessel, $\dot{v}_a$ and $\dot{\omega}_a$ are respectively a maximum acceleration and an angular acceleration under the condition that the unmanned surface vessel is accelerated, and $\dot{v}_b$ and $\dot{\omega}_b$ are respectively a maximum acceleration and an angular acceleration under the condition that the unmanned surface vessel is decelerated, wherein $$v_d \leq \sqrt{2R_T \frac{g}{\dot{v}_b}}, \quad (6)$$

$$\omega_d \leq \sqrt{2R_T \frac{g}{\dot{\omega}_b}}, \quad (7)$$

wherein Rt in the formulas (6) and (7) is a relative distance between the unmanned surface vessel and the neighboring navigating ship, so that the unmanned surface vessel can stop before colliding with the encountering ship;

the unmanned surface vessel can reach a heading window $\theta_d$ within a time $\Delta t$:

$$\theta_d = \left\{\theta \middle| \theta \in \left[\theta_c + \omega_c\Delta t - \frac{1}{2}\frac{g}{\dot{\omega}_b}\Delta t^2, \theta_c + \omega_c\Delta t + \frac{1}{2}\frac{g}{\dot{\omega}_a}\Delta t^2\right]\right\}, \quad (8)$$

wherein, in the formula (8), $\theta$ represents a heading angle of the unmanned surface vessel, and $\theta_c$ represents a current heading angle of the unmanned surface vessel;

constructing a feasible speed set of the unmanned surface vessel via the speed window $v_d$ and the heading window $\theta_d$, and performing intersection operation with the collision-free speed set obtained in the step S3 to obtain the feasible collision-free speed set RAV of the unmanned surface vessel.

Preferably, the step S5 specifically comprises: introducing segment lines to divide the absolute speed set, i.e., an absolute speed space, of the unmanned surface vessel into four regions which are respectively $WVO_{UO}$, $V_1$, $V_2$ and $V_3$, wherein the segment lines are perpendicular to angular bisectors of the two tangent lines in the speed barrier region and are tangential to a bottom end of $WVO_{UO}$, wherein the speed of the region $V_1$ represents that the unmanned surface vessel passes through the neighboring navigating ship from a larboard, and a mathematical description of the region $V_1$ is as follows:

$$V_1=\{v|[(P_o-P_u)\times(v-v_o)]_z<0, v\notin WVO_{UO}, v\notin V_3\} \quad (9);$$

wherein in the formula (9), $[\ ]_z$ is used for extracting an z axis component of a vector, herein the geometric center of the unmanned surface vessel is a circle point, an exact front is an x axial positive direction, a exact right direction is a y axial positive direction, and the z axial positive direction points to a principal plane inwards;

the speed of the region $V_2$ represents that the unmanned surface vessel passes through the neighboring navigating ship from a starboard, and a mathematical description of the region $V_2$ is as follows:

$$V_2=\{v|[(P_o-P_u)\times(v-v_o)]_z>0, v\notin WVO_{UO}, v\notin V_3\} \quad (10);$$

wherein the speed of the region $V_3$ represents that the unmanned surface vessel departs from the neighboring navigating ship, and a mathematical description of the region $V_3$ is as follows:

$$V_3=\{v|(P_o-P_u)\cdot(v-v_o)<0, v\notin WVO_{UO}\} \quad (11);$$

obtaining the ultimate candidate speed set CRAV meeting the international regulations for preventing collisions at sea in combination with the international regulations for preventing collisions at sea;

constraining the speed of the unmanned surface vessel in the region of $V_1$ and $V_3$ when the unmanned surface vessel and the neighboring navigating ship are in an overtaking or a left-intersection situation, $$CRAV=\{v|v\in RAV, v\in V_1\cup V_3\} \quad (12);$$

constraining the speed of the unmanned surface vessel in the region of $V_2$ and $V_3$ when the unmanned surface vessel and the neighboring navigating ship are in an encountering or a right-intersection situation, $$CRAV=\{v|v\in RAV, v\in V_2\cup V_3\} \quad (13),$$

wherein, in the formula (9) to the formula (11), $P_o$ represents a position vector of the neighboring navigating ship and v represents an absolute speed of the unmanned surface vessel.

Preferably, the step S6 specifically includes: performing discretized grid processing on speed v and heading direction θ in the candidate speed set, specifically, discretizing the speed v into M discrete speeds according to equally spaced grids, discretizing the heading direction θ into N discrete heading directions according to the equally spaced grids, each discrete speed and discrete heading direction forming an integral speed vector, and finally, discretizing the whole set to M×N speed vectors, wherein M and N are natural numbers, $$M = \text{INT}((v_{max} - v_{min})\Delta v) + 1 \quad (14),$$

$$N = \text{INT}(2\pi/\Delta\theta) + 1 \quad (15),$$

wherein, in the formula (14) and (15), INT is a rounding function, $v_{max}$ and $v_{min}$ are maximum and minimum speeds of the unmanned surface vessel, Δv is a minimum speed variation of the unmanned surface vessel, and Δθ is a minimum heading angle variation of the unmanned surface vessel;

constructing a cost function to evaluate M×N speed vectors, wherein with respect to each discrete speed $v_i$ and discrete heading direction $\theta_j$, 1≤i≤M, 1≤j≤N, and a cost thereof can be calculated according to formulas below:

$$C_{ij} = \omega_1 \left\| \begin{bmatrix} v_i \cos\theta_j \\ v_i \sin\theta_j \end{bmatrix} - v_g \right\|_2 + \omega_2 \left\| \begin{bmatrix} v_i \cos\theta_j \\ v_i \sin\theta_j \end{bmatrix} - \begin{bmatrix} v_c \cos\theta_c \\ v_c \sin\theta_c \end{bmatrix} \right\|_2, \quad (16)$$

$$v_g = v_c \frac{P_g - P_u}{\|P_g - P_u\|_2}, \quad (17)$$

wherein, in the formulas (16) and (17), $v_g$ is a target speed vector of the unmanned surface vessel to a next local sub target point, $v_c$ is a a current speed of the unmanned surface vessel, $\theta_c$ is a current heading angle of the unmanned surface vessel, $P_g$ is a position vector of the next local sub target point, $P_u$ is a position vector of the unmanned surface vessel, $\omega_1$ and $\omega_2$ are two weight coefficient, the cost of the M×N speed vectors is calculated, and the speed $v_u^{opt}$ with the minimum cost is taken as an optimum collision avoidance speed of the unmanned surface vessel.

Preferably, $C_{ij}$ synthesizes influence of two dimensionalities: target orientation and speed variation, the speed set deviated from the target point and the speed variation has a larger cost, and the two weight coefficient shall meet $\omega_1 > \omega_2$ in considering target orientation which a local obstacle avoidance algorithm shall have.

Preferably, the step S7 specifically includes: adding an internal recycle that calculates a route replanning point, continuously detecting whether the target speed vector $v_g$ of the unmanned surface vessel arriving the next local sub target point is in the set CRAV or not in a process simulating that the unmanned surface vessel navigates at the speed $v_u^{opt}$, and if it is not in the CRAV set, performing a simulation process of a next time period, and performing circulation successively till $v_g \in \text{CRAV}$ is met; and calculating the position vector $P_u$ of the route replanning point according to the position vector $P_r$ in an initial simulation stage of the unmanned surface vessel and a total time consumed by simulation:

$$P_r = P_u + v_u^{opt} n\Delta t \quad (18),$$

wherein, in the formula (18), n represents a circulation number of times of simulation, and Δt represents a time period of simulation.

Compared with the prior art, the present invention has the advantages and effects as follows.

The present invention adopts the direction bounding box to describe the geometric models of the unmanned surface vessel and the neighboring navigating ship and can better fit a characteristic that a length-width ratio of the ship is great, and meanwhile, it is convenient to obtain a more excellent collision avoidance strategy as more feasible paths are lost; the observing uncertainty of the movement information of the neighboring navigating ship is compensated by introducing the degree of uncertainty of speed of the speed barrier region, and the safety buffering function is provided to dynamic collision avoidance of the unmanned surface vessel by adding a layer of soft constraint in the periphery of the collision cone; the speed of the unmanned surface vessel is further constrained in combination with the dynamic characteristic of the unmanned surface vessel itself and the international regulations for preventing collisions at sea, so that reliable dynamic collision avoidance between the unmanned surface vessel and the neighboring navigating ship can be realized while the collision avoidance strategy of the unmanned surface vessel meets manoeuvreability of the unmanned surface vessel itself; the dynamic collision avoidance algorithm provided by the present invention realizes dynamic collision avoidance, meeting the international regulations for preventing collisions at sea, between the unmanned surface vessel and the neighboring navigating ship, so that it can be widely applied to autonomous intelligent control of various unmanned vessels.

DETAILED DESCRIPTION

Further description of the present invention in detail will be made below in combination with specific embodiments and drawings, but implementation modes of the present invention are not limited thereto.

Embodiment

Figure 1:
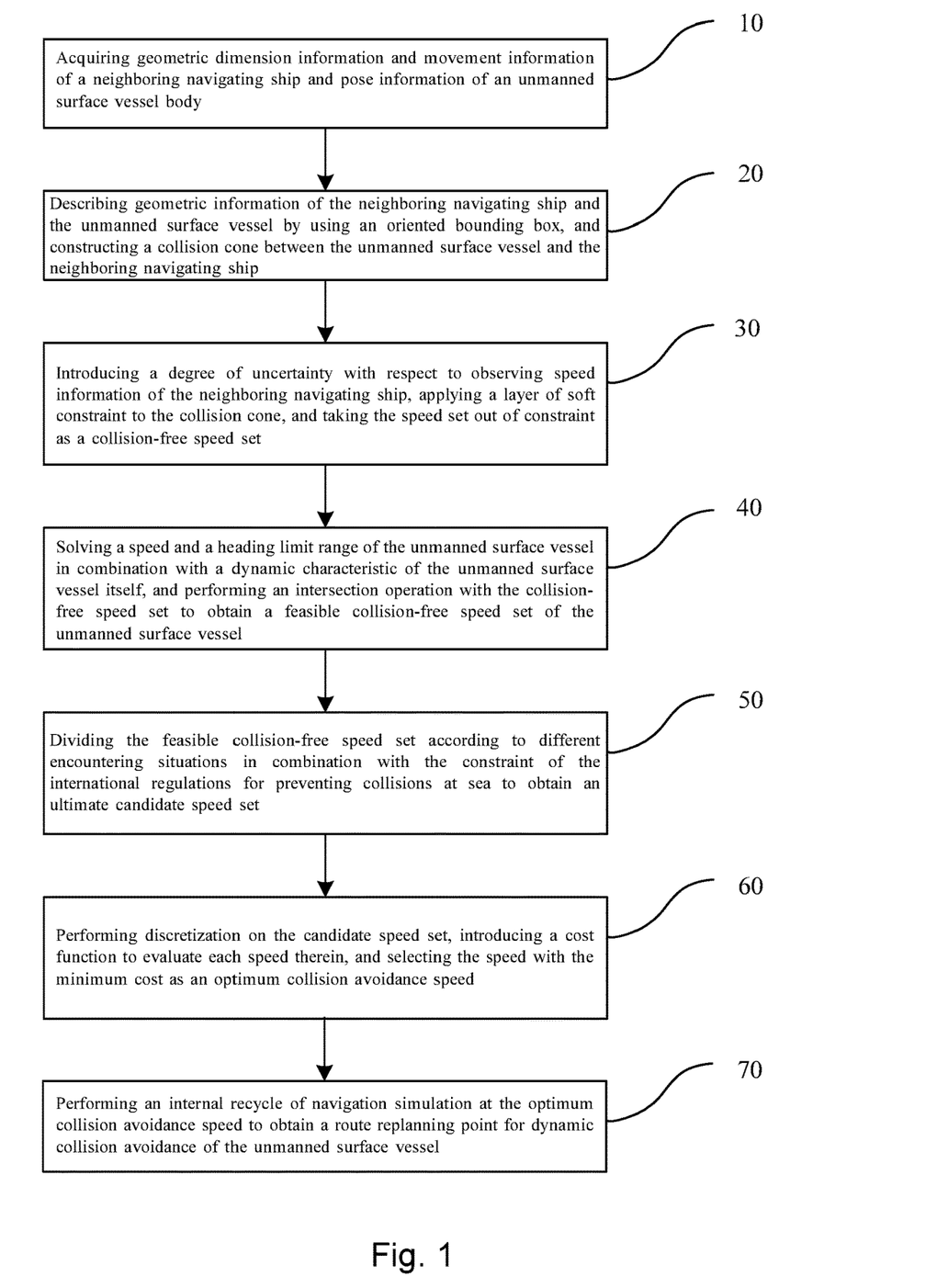
FIG. 1 is a flow diagram of a dynamic collision avoidance method for an unmanned surface vessel based on route replanning.
Figure 2:
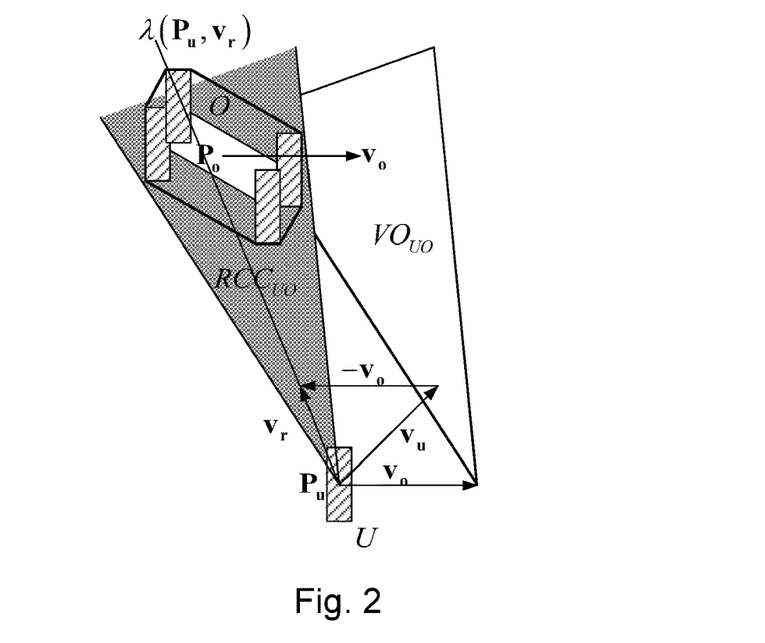
FIG. 2 is a schematic diagram of constructing a collision cone $VO_{OU}$ under an absolute speed set in an embodiment.

The embodiment provides a dynamic collision avoidance method for an unmanned surface vessel based on route replanning, as shown in FIG. 1, including the following steps:

S1: real-time data of a vessel-borne sensor is collected, and key information in a dynamic collision avoidance process is acquired, specifically, the geometric dimension information and the movement information of the neighboring navigating ship are acquired by using the AIS system, longitude and latitude of the unmanned surface vessel are acquired by using GPS and a three-dimensional course angle of the unmanned surface vessel is acquired by using an electronic compass;

S2: the unmanned surface vessel and the neighboring navigating ship are described with the direction bounding box when the collision cone is constructed according to the geometric information and the movement information of the neighboring navigating ship and the unmanned surface vessel, as shown in FIG. 2. An oblique line filling rectangular frame U represents the unmanned surface vessel, a filling-free rectangular frame O represents the neighboring navigating ship, $P_u$ and $v_u$ respectively represent a position vector and a speed vector of the unmanned surface vessel, and $P_o$ and $v_o$ respectively represent a position vector and a speed vector of the neighboring navigating ship. There will be two relative conversion processes when the collision cone is constructed: one is relative conversion of the dimension information, which specifically includes: the rectangular bounding box of the unmanned surface vessel is superposed continuously by taking a point on an edge line of the rectangular bounding box of the neighboring navigating ship as a geometric center, and the most periphery region after superposing is regarded as a barrier region, so that the unmanned surface vessel is regarded as a mass point. Started from the mass point, two tangent lines of the barrier region are drawn, and a region surrounded by the two tangent lines is regarded as a speed barrier region. Another one is relative conversion of the movement information, which specifically includes: the speed $v_r = v_u - v_o$ of the unmanned surface vessel relative to the neighboring navigating ship is calculated, so that the neighboring navigating ship can be regarded as being static.

A ray started from a geometric center $P_u$ of the unmanned surface vessel at a relative speed $v_r$ is defined as:

$$\lambda(P_u, v_r) = \{P_u + v_r t | t \geq 0\} \qquad (1),$$

wherein t in the formula (1) represents time. Therefore, the actual physical meaning of the ray $\lambda(P_u, v_r)$ represents a change condition of relative positions of the two ships under the circumstance that the unmanned surface vessel and the neighboring navigating ship keep unchanged moving conditions. When the ray $\lambda(P_u, v_r)$ is intersected with the enlarged neighboring navigating ship, i.e., the ray falls between the two peripheral lines of the speed barrier region, it can be thought that the unmanned surface vessel must collide with the neighboring navigating ship at a certain moment. An absolute speed $v_r$ set of all unmanned surface vessels causing that the unmanned surface vessel collides with the navigating neighboring ship is defined as the collision cone $RCC_{UO}$ under the absolute speed set. Similarly, an absolute speed $v_u$ set of all unmanned surface vessels causing that the unmanned surface vessel collides with the navigating neighboring ship is defined as the collision cone $VO_{UO}$ under the absolute speed set:

$$VO_{UO} = RCC_{UO} \oplus v_o \qquad (2),$$

wherein $\oplus$ in the formula (2) is Minkowski vector and operation with actual physical meaning of translating a relative collision region $RCC_{UO}$ at the speed $v_o$ of the neighboring navigating ship.

Figure 3:
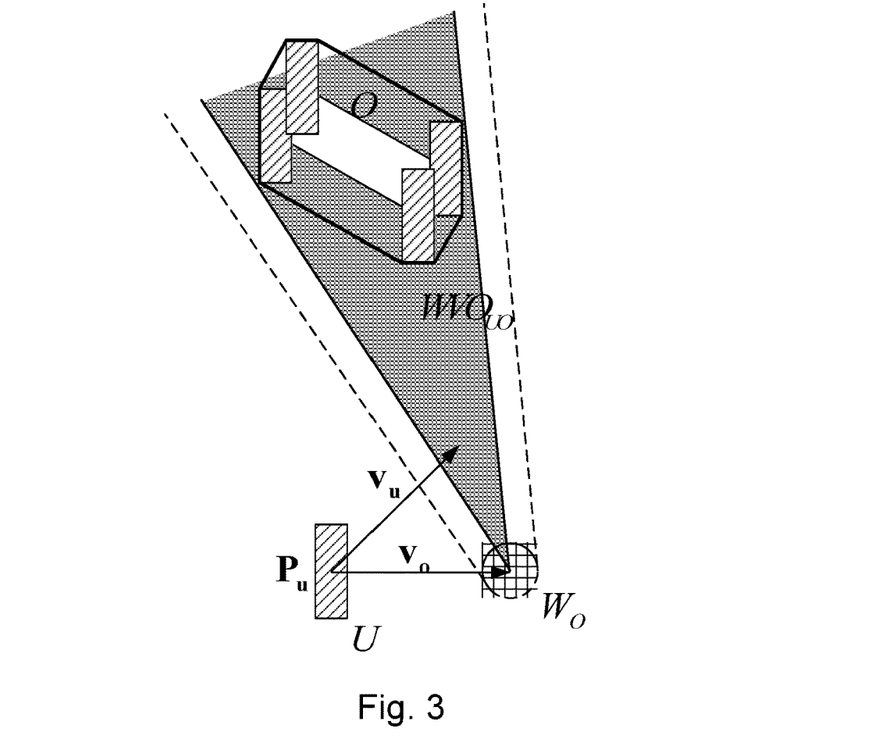
FIG. 3 is a schematic diagram of constructing a collision cone region $WVO_{UO}$ when the uncertainty $\delta_O$ is maximum in an embodiment.

S3: a degree of uncertainty $\delta_O$ of the speed of the neighboring navigating ship is introduced after the collision cone is constructed; all uncertain portions in a parameter of the speed of the neighboring navigating ship are categorized as a set $\{W_O | \delta_O \in W_O\}$, wherein the set $W_O$ is a bounded set and an upper bound thereof is a constant; so that a collision cone region $WVO_{UO}$ under the worst circumstance can be constructed:

$$WVO_{UO} = VO_{UO} \oplus W_O \qquad (3),$$

wherein a schematic diagram of $WVO_{UO}$ is shown in FIG. 3; as the upper bound of the set of the degree of uncertainty of speed of the dynamic neighboring navigating ship is a constant, a round region filled with grid lines can be used to represent $W_O$, and the $WVO_{UO}$ set at the moment is equivalent to be enlarged by a circle based on the original one, and the soft constraint of the $W_O$ herein is equivalent to provide the safe buffer effect to local obstacle avoidance of the unmanned surface vessel. The speed set except $WVO_{UO}$ is marked as the collision-free speed set.

S4: a concept of a dynamic window is introduced to further constrain a feasible speed space of the unmanned surface vessel in combination with a dynamic characteristic of the unmanned surface vessel itself; a time window $\Delta t$ given; and a speed window $v_d$ and an angular speed window $\omega_d$ capable of being reached by the unmanned surface vessel within a time $\Delta t$ are calculated, $$v_d = \left\{ v \middle| v \in \left[ v_c - \overset{g}{\dot{v}_b} \Delta t, \, v_c + \overset{g}{\dot{v}_a} \Delta t \right] \right\}, \qquad (4)$$

$$\omega_d = \left\{ \omega \middle| \omega \in \left[ \omega_c - \overset{g}{\dot{\omega}_b} \Delta t, \, \omega_c + \overset{g}{\dot{\omega}_a} \Delta t \right] \right\}, \qquad (5)$$

wherein v and ω in the formulas (4) and (5) are respectively a speed and an angular speed of the unmanned surface vessel, $v_c$ and $\omega_c$ respectively represent the current speed and angular speed of the unmanned surface vessel, $\overset{g}{\dot{v}_a}$ and $\overset{g}{\dot{\omega}_a}$ are respectively a maximum acceleration and an angular acceleration under the condition that the unmanned surface vessel is accelerated, and $\overset{g}{\dot{v}_b}$ and $\overset{g}{\dot{\omega}_b}$ are respectively a maximum acceleration and an angular acceleration under the condition that the unmanned surface vessel is decelerated, $$v_d \leq \sqrt{2 R_T \overset{g}{\dot{v}_b}}, \qquad (6)$$

$$\omega_d \leq \sqrt{2 R_T \overset{g}{\dot{\omega}_b}}, \qquad (7)$$

wherein $R_T$ in the formulas (6) and (7) is a relative distance between the unmanned surface vessel and the neighboring navigating ship, so that the unmanned surface vessel can stop before colliding with the encountering ship;

the unmanned surface vessel can reach a heading window $\theta_d$ within a time $\Delta t$:

$$\theta_d = \left\{ \theta \middle| \theta \in \left[ \theta_c + \omega_c \Delta t - \frac{1}{2} \overset{g}{\dot{\omega}_b} \Delta t^2, \, \theta_c + \omega_c \Delta t + \frac{1}{2} \overset{g}{\dot{\omega}_a} \Delta t^2 \right] \right\}, \qquad (8)$$

wherein, in the formula (8), θ represents a heading angle of the unmanned surface vessel, and $\theta_c$ represents a current heading angle of the unmanned surface vessel;

constructing a feasible speed set of the unmanned surface vessel via the speed window $v_d$ and the heading window $\theta_d$, and performing intersection operation with the collision-free speed set obtained in the step S3 to obtain the feasible collision-free speed set RAV of the unmanned surface vessel.

Figure 4:
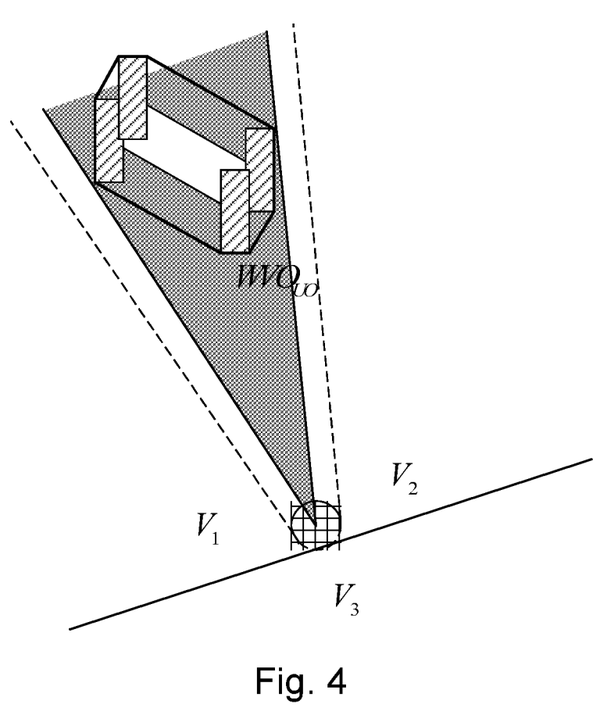
FIG. 4 is a schematic diagram of dividing an absolute speed spatial region of an unmanned surface vessel in an embodiment.

S5: as shown in FIG. 4, segment lines are introduced to divide the absolute speed set, i.e., an absolute speed space, of the unmanned surface vessel into four regions which are respectively $WVO_{UO}$, $V_1$, $V_2$ and $V_3$, wherein the region of $WVO_{UO}$ is the enlarged collision cone region, and the segment lines are perpendicular to angular bisectors of the two tangent lines in the speed barrier region and are tangential to a bottom end of $WVO_{UO}$, wherein the speed of the region $V_1$ represents that the unmanned surface vessel passes through the neighboring navigating ship from a larboard, and a mathematical description of the region $V_1$ is as follows:

$$V_1=\{v|[(P_o-P_u)\times(v-v_o)]_z<0, v\notin WVO_{UO}, v\notin V_3\} \quad (9);$$

wherein, in the formula (9), $[\ ]_z$ is used for extracting an z axis component of a vector, herein the geometric center of the unmanned surface vessel is a circle point, an exact front is an x axial positive direction, an exact right direction is a y axial positive direction, and the z axial positive direction is points to a principal plane inwards;

the speed of the region $V_2$ represents that the unmanned surface vessel passes through the neighboring navigating ship from a starboard, and a mathematical description of the region $V_2$ is as follows:

$$V_2=\{v|[(P_o-P_u)\times(v-v_o)]_z>0, v\notin WVO_{UO}, v\notin V_3\} \quad (10);$$

wherein the speed of the region $V_3$ represents that the unmanned surface vessel departs from the neighboring navigating ship, and a mathematical description of the region $V_3$ is as follows:

$$V_3=\{v|(P_o-P_u)\cdot(v-v_o)<0, v\notin WVO_{UO}\} \quad (11);$$

the ultimate candidate speed set CRAV meeting the international regulations for preventing collisions at sea is obtained in combination with the international regulations for preventing collisions at sea;

the speed of the unmanned surface vessel is constrained in the region of $V_1$ and $V_3$ when the unmanned surface vessel and the navigating neighboring ship are in an overtaking or a left-intersection situation, $$CRAV=\{v|v\in RAV, v\in V_1\cup V_3\} \quad (12);$$

the speed of the unmanned surface vessel is constrained in the region of $V_2$ and $V_3$ when the unmanned surface vessel and the navigating neighboring ship are in an encountering or a right-intersection situation, $$CRAV=\{v|v\in RAV, v\in V_2\cup V_3\} \quad (13),$$

wherein, in the formula (9) to the formula (11), $P_o$ represents a position vector of the neighboring navigating ship, and v represents an absolute speed of the unmanned surface vessel.

S6: discretized grid processing is performed on speed v and heading direction θ in the candidate speed set, specifically, the speed v is discretized into M discrete speeds according to equally spaced grids, the heading direction θ is discretized into N discrete heading directions according to the equally spaced grids, each discrete speed and discrete heading direction forming an integral speed vector, and finally, the whole set is discretized to M×N speed vectors, wherein M and N are natural numbers, $$M=\text{INT}((v_{max}-v_{min})/\Delta v)+1 \quad (14),$$

$$N=\text{INT}(2\pi/\Delta\theta)+1 \quad (15),$$

wherein, in the formulas (14) and (15), INT is a rounding function, $v_{max}$ and $v_{min}$ are maximum and minimum speeds of the unmanned surface vessel, Δv is a minimum speed variation of the unmanned surface vessel, and Δθ is a minimum heading angle variation of the unmanned surface vessel;

a cost function is constructed to evaluate M×N speed vectors, wherein with respect to each discrete speed $v_i$ and discrete heading direction $\theta_j$, $1\leq i\leq M$, $1\leq j\leq N$, and a cost thereof can be calculated according to formulas below:

$$C_{ij}=\omega_1\left\|\begin{bmatrix}v_i\cos\theta_j\\v_i\sin\theta_j\end{bmatrix}-v_g\right\|_2+\omega_2\left\|\begin{bmatrix}v_i\cos\theta_j\\v_i\sin\theta_j\end{bmatrix}-\begin{bmatrix}v_c\cos\theta_c\\v_c\sin\theta_c\end{bmatrix}\right\|_2, \quad (16)$$

$$v_g=v_c\frac{P_g-P_u}{\|P_g-P_u\|_2}, \quad (17)$$

wherein, in the formulas (16) and (17), $v_g$ is a target speed vector of the unmanned surface vessel to a next local sub target point, $v_c$ is a current speed of the unmanned surface vessel, $\theta_c$ is a current heading angle of the unmanned surface vessel, $P_g$ is a position vector of the next local sub target point, $P_u$ is a position vector of the unmanned surface vessel, $\omega_1$ and $\omega_2$ are two weight coefficient, a cost evaluation function $C_{ij}$ synthesizes influence of two dimensionalities: target orientation and speed variation, the speed set which is deviated from the target point and has large speed variation has a larger cost, and the two weight coefficient shall meet $\omega_1>\omega_2$ in considering target orientation of a local obstacle avoidance algorithm. The cost of the M×N speed vectors is calculated, and the speed $v_u^{opt}$ with the minimum cost is taken as an optimum collision avoidance speed of the unmanned surface vessel.

S7: an internal recycle that calculates a route replanning point is added, whether the target speed vector $v_g$ of the unmanned surface vessel arriving the next local sub target point is in the set CRAV or not is continuously detected in a process simulating that the unmanned surface vessel navigates at the speed $v_u^{opt}$, and if it is not in the CRAV set, a simulation process of a next time period is performed, and circulation is performed successively till $v_g\in$ CRAV is met. The position vector $P_r$ of the route replanning point is calculated according to the position vector $P_u$ in an initial simulation stage of the unmanned surface vessel and a total time consumed by simulation:

$$P_r=P_u+v_u^{opt}n\Delta t \quad (18),$$

wherein, in the formula (18), n represents a number of circulation times of simulation, and Δt represents a time period of simulation.

The embodiments are preferred modes of execution of the present invention. The modes of execution of the present invention are not limited by the above-mentioned embodiments. Any other changes, modifications, substitutions, combinations and simplifications made without departing from the spirit and principle of the present invention shall be equivalent substitute modes and shall come within the protection scope of the present invention.

What is claimed is:

1. A dynamic collision avoidance method for an unmanned surface vessel based on route replanning, the method comprising the following steps:
   S1: collecting real-time data of a vessel-borne sensor, and acquiring geometric dimension information, movement information and pose information of an unmanned surface vessel body of a neighboring navigating ship;
   S2: describing geometric information of the neighboring navigating ship and the unmanned surface vessel by using an oriented bounding box in combination with the geometric dimension information and movement information of the neighboring navigating ship and pose information of the unmanned surface vessel body, and establishing a speed set when the unmanned surface vessel collides with the neighboring navigating ship, i.e., constructing a collision cone between the unmanned surface vessel and the neighboring navigating ship;

S3: introducing the uncertainty of observing the velocity information of ships sailing in the neighborhood, translating the collision cone outwards at a quantity of an upper bound value of the degree of uncertainty, i.e., applying a layer of soft constraint to the collision cone, and taking the speed set out of constraint as a collision-free speed set;

S4: solving a speed and a heading limit range of the unmanned surface vessel in combination with a dynamic characteristic of the unmanned surface vessel itself, and performing an intersection operation with the collision-free speed set to obtain a feasible collision-free speed set of the unmanned surface vessel;

S5: dividing the feasible collision-free speed set according to different encountering situations in combination with the constraint of the international regulations for preventing collisions at sea to obtain an ultimate candidate speed set;

S6: performing discretization on the candidate speed set, introducing a cost function to evaluate each speed therein, and selecting the speed with the smallest cost as an optimum collision avoidance speed;

S7: performing an internal recycle of navigation simulation at the optimum collision avoidance speed to obtain a route replanning point for dynamic collision avoidance of the unmanned surface vessel.

2. The dynamic collision avoidance method for an unmanned surface vessel based on route replanning according to claim 1, wherein the step S1 specifically comprises: acquiring the geometric dimension information and the movement information of the neighboring navigating ship by using an AIS system, acquiring longitude and latitude of the unmanned surface vessel by using GPS and acquiring a three-dimensional course angle of the unmanned surface vessel by using an electronic compass.

3. The dynamic collision avoidance method for an unmanned surface vessel based on route replanning according to claim 1, wherein the step S2 specifically comprises: generating a smallest rectangular bonding frame along a main component direction of the unmanned surface vessel and the neighboring navigating ship to describe shapes of the unmanned surface vessel and the neighboring navigating ship uniformly and correspondingly, respectively; superposing the geometric dimension of the unmanned surface vessel itself to the neighboring navigating ship along a navigation direction, specifically, superposing the rectangular bounding frame of the unmanned surface vessel by taking a point on a side line of the rectangular bonding frame of the neighboring navigating ship as a geometric center and regarding a most peripheral region after superposing as a barrier region so as to regard the unmanned surface vessel as a mass point; and started from the mass point, drawing two tangent lines of the barrier region, regarding a region surrounded by the two tangent lines as a speed barrier region, wherein the tangent line is a ray started from a geometric center $P_u$ of the unmanned surface vessel at a relative speed $v_r$:

$$\lambda(P_u, v_r) = \{P_u + v_r t | t \geq 0\} \quad (1),$$

wherein, in the formula (1), t represents a time, $v_r$ is a speed $v_r = v_u - v_o$ of the unmanned surface vessel relative to the neighboring navigating ship, $P_u$ and $v_u$ respectively represent a position vector and a speed vector of the unmanned surface vessel, and $v_o$ represents a speed vector of the neighboring navigating ship; when the ray $\lambda(P_u, v_r)$ is intersected with the speed barrier region, i.e., the ray falls between the two tangent lines of the speed barrier region, it is thought that the unmanned surface vessel must collide with the neighboring navigating ship at a certain moment; defining a relative speed $v_r$ set when the unmanned surface vessel collides with the neighboring navigating ship as the collision cone $RCC_{UO}$ under the relative speed set; and defining an absolute speed $v_u$ set of all unmanned surface vessels when the unmanned surface vessel collides with the neighboring navigating ship as the collision cone $VO_{UO}$ under the absolute speed set:

$$VO_{UO} = RCC_{UO} \oplus v_o \quad (2),$$

wherein $\oplus$ in the formula (2) is Minkowski vector and operation with actual physical meaning of translating a relative collision region $RCC_{UO}$ at the speed $v_o$ of the neighboring navigating ship.

4. The dynamic collision avoidance method for an unmanned surface vessel based on route replanning according to claim 3, wherein the step S3 specifically comprises: introducing a degree of uncertainty $\delta_O$ of the speed of the neighboring navigating ship after constructing the collision cone; categorizing all uncertain portions in a parameter of the speed of the neighboring navigating ship as a set $\{W_O | \delta_O \in W_O\}$, the set $W_O$ is a bounded set and an upper bound thereof is a constant; and translating the collision cone outwards a quantity of an upper bound value of the degree of uncertainty, wherein a collision cone region $WVO_{UO}$ when the degree of uncertainty $\delta_O$ is the maximum can be constructed:

$$WVO_{UO} = VO_{UO} \oplus W_O \quad (3),$$

the speed set except $WVO_{UO}$ is marked as the collision-free speed set.

5. The dynamic collision avoidance method for an unmanned surface vessel based on route replanning according to claim 4, wherein the step S4 specifically comprises: introducing a concept of a dynamic window to further constrain a feasible speed space of the unmanned surface vessel in combination with the dynamic characteristic of the unmanned surface vessel itself; giving a time window $\Delta t$; and calculating a speed window $v_d$ and an angular speed window $\omega_d$ capable of being reached by the unmanned surface vessel within a time $\Delta t$, $$v_d = \left\{ v \middle| v \in \left[ v_c - \dot{v}_b \Delta t, v_c + \dot{v}_a \Delta t \right] \right\}, \quad (4)$$

$$\omega_d = \left\{ \omega \middle| \omega \in \left[ \omega_c - \dot{\omega}_b \Delta t, \omega_c + \dot{\omega}_a \Delta t \right] \right\}, \quad (5)$$

wherein v and ω in the formulas (4) and (5) are respectively a speed and an angular speed of the unmanned surface vessel, $v_c$ and $\omega_c$ respectively represent the current speed and angular speed of the unmanned surface vessel, $\dot{v}_a$ and $\dot{\omega}_a$ are respectively a maximum acceleration and an angular acceleration under the condition that the unmanned surface vessel is accelerated, and $\dot{v}_b$ and $\dot{\omega}_b$ are respectively a maximum acceleration and an angular acceleration under the condition that the unmanned surface vessel is decelerated, wherein $$v_d \le \sqrt{2R_T \frac{g}{v_b}}, \quad (6)$$

$$\omega_d \le \sqrt{2R_T \frac{g}{\omega_b}}, \quad (7)$$

wherein $R_T$ in the formulas (6) and (7) is a relative distance between the unmanned surface vessel and the neighboring navigating ship, so that the unmanned surface vessel can stop before colliding with the encountering ship;

the unmanned surface vessel can reach a heading window $\theta_d$ within a time $\Delta t$:

$$\theta_d = \left\{\theta \middle| \theta \in \left[\theta_c + \omega_c \Delta t - \frac{1}{2}\dot{\omega}_b \Delta t^2, \theta_c + \omega_c \Delta t + \frac{1}{2}\dot{\omega}_a \Delta t^2\right]\right\}, \quad (8)$$

wherein, in the formula (8), $\theta$ represents a heading angle of the unmanned surface vessel, and $\theta_c$ represents a current heading angle of the unmanned surface vessel; constructing a feasible speed set of the unmanned surface vessel via the speed window $v_d$ and the heading window $\theta_d$, and performing intersection operation with the collision-free speed set obtained in the step S3 to obtain the feasible collision-free speed set RAV of the unmanned surface vessel.

6. The dynamic collision avoidance method for an unmanned surface vessel based on route replanning according to claim 5, the step S5 specifically comprises: introducing segment lines to divide the absolute speed set, i.e., an absolute speed space, of the unmanned surface vessel into four regions which are respectively $WVO_{UO}$, $V_1$, $V_2$ and $V_3$, wherein the segment lines are perpendicular to angular bisectors of the two tangent lines in the speed barrier region and are tangential to a bottom end of $WVO_{UO}$, wherein the speed of the region $V_1$ represents that the unmanned surface vessel passes through the neighboring navigating ship from a larboard, and a mathematical description of the region $V_1$ is as follows:

$$V_1 = \{v | [(P_o - P_u) \times (v - v_o)]_z < 0, v \notin WVO_{UO}, v \notin V_3\} \quad (9),$$

wherein, in the formula (9), $[\ ]_z$ is used for extracting an z axis component of a vector, herein the geometric center of the unmanned surface vessel is a circle point, an exact front is an x axial positive direction, an exact right direction is a y axial positive direction, and an z axial positive direction points to a principal plane inwards;

the speed of the region $V_2$ represents that the unmanned surface vessel passes through the neighboring navigating ship from a starboard, and a mathematical description of the region $V_2$ is as follows:

$$V_2 = \{v | [(P_o - P_u) \times (v - v_o)]_z > 0, v \notin WVO_{UO}, v \notin V_3\} \quad (10),$$

wherein the speed of the region $V_3$ represents that the unmanned surface vessel departs from the neighboring navigating ship, and a mathematical description of the region $V_3$ is as follows:

$$V_3 = \{v | (P_o - P_u) \cdot (v - v_o) < 0, v \notin WVO_{UO}\} \quad (11);$$

obtaining the ultimate candidate speed set CRAV meeting the international regulations for preventing collisions at sea in combination with the international regulations for preventing collisions at sea;

constraining the speed of the unmanned surface vessel in the region of $V_1$ and $V_3$ when the unmanned surface vessel and the neighboring navigating ship are in an overtaking or a left-intersection situation, $$CRAV = \{v | v \in RAV, v \in V_1 \cup V_3\} \quad (12);$$

constraining the speed of the unmanned surface vessel in the region of $V_2$ and $V_3$ when the unmanned surface vessel and the neighboring navigating ship are in an encountering or a right-intersection situation, $$CRAV = \{v | v \in RAV, v \in V_2 \cup V_3\} \quad (13),$$

wherein, in the formula (9) to the formula (11), $P_o$ represents a position vector of the neighboring navigating ship and v represents an absolute speed of the unmanned surface vessel.

7. The dynamic collision avoidance method for an unmanned surface vessel based on route replanning according to claim 6, wherein the step S6 specifically comprises: performing discretized grid processing on speed v and heading direction $\theta$ in the candidate speed set CRAV, specifically, discretizing the speed v into M discrete speeds according to equally spaced grids, discretizing the heading direction $\theta$ into N discrete heading directions according to the equally spaced grids, each discrete speed and discrete heading direction forming an integral speed vector, and finally, discretizing the whole set into M×N speed vectors, wherein M and N are natural numbers, $$M = INT((v_{max} - v_{min})/\Delta v) + 1 \quad (14),$$

$$N = INT(2\pi/\Delta\theta) + 1 \quad (15),$$

wherein, in the formulas (14) and (15), INT is a rounding function, $v_{max}$ and $v_{min}$ are maximum and minimum speeds of the unmanned surface vessel, $\Delta v$ is a minimum speed variation of the unmanned surface vessel, and $\Delta\theta$ is a minimum heading angle variation of the unmanned surface vessel;

constructing a cost function to evaluate M×N speed vectors, wherein with respect to each discrete speed $v_i$ and discrete heading direction $\theta_j$, $1 \le i \le M$, $1 \le j \le N$, and a cost thereof can be calculated according to formulas below:

$$C_{ij} = \omega_1 \left\| \begin{bmatrix} v_i \cos\theta_j \\ v_i \sin\theta_j \end{bmatrix} - v_g \right\|_2 + \omega_2 \left\| \begin{bmatrix} v_i \cos\theta_j \\ v_i \sin\theta_j \end{bmatrix} - \begin{bmatrix} v_c \cos\theta_c \\ v_c \sin\theta_c \end{bmatrix} \right\|_2, \quad (16)$$

$$v_g = v_c \frac{P_g - P_u}{\|P_g - P_u\|_2}, \quad (17)$$

wherein, in the formulas (16) and (17), $C_{ij}$ is a cost evaluation function, $v_g$ is a target speed vector of the unmanned surface vessel to a next local sub target point, $v_c$ is a a current speed of the unmanned surface vessel, $\theta_c$ is a current heading angle of the unmanned surface vessel, $P_g$ is a position vector of the next local sub target point, $P_u$ is a position vector of the unmanned surface vessel, $\omega_1$ and $\omega_2$ are two weight coefficient, the cost of the M×N speed vectors is calculated, and the speed $v_u^{opt}$ with the minimum cost is taken as an optimum collision avoidance speed of the unmanned surface vessel.

8. The dynamic collision avoidance method for an unmanned surface vessel based on route replanning according to claim 7, wherein $\omega_1 > \omega_2$.

9. The dynamic collision avoidance method for an unmanned surface vessel based on route replanning according to claim 7, wherein the step S7 specifically comprises: adding an internal recycle that calculates a route replanning point, detecting whether the target speed vector $v_g$ of the unmanned surface vessel arriving the next local sub target point is in the set CRAV or not in a process simulating that the unmanned surface vessel navigates at the speed $v_u^{opt}$, and if it is not in the CRAV set, performing a simulation process of a next time period, and performing circulation successively till $v_g \in CRAV$ is met; and calculating the position vector $P_u$ of the route replanning point according to the position vector $P_r$ in an initial simulation stage of the unmanned surface vessel and a total time consumed by simulation:

$$P_r = P_u + v_u^{opt} n \Delta t \quad (18),$$

wherein, in the formula (18), n represents a number of circulation times of simulation, and $\Delta t$ represents a time period of simulation.

* * * * *